Figure 1:
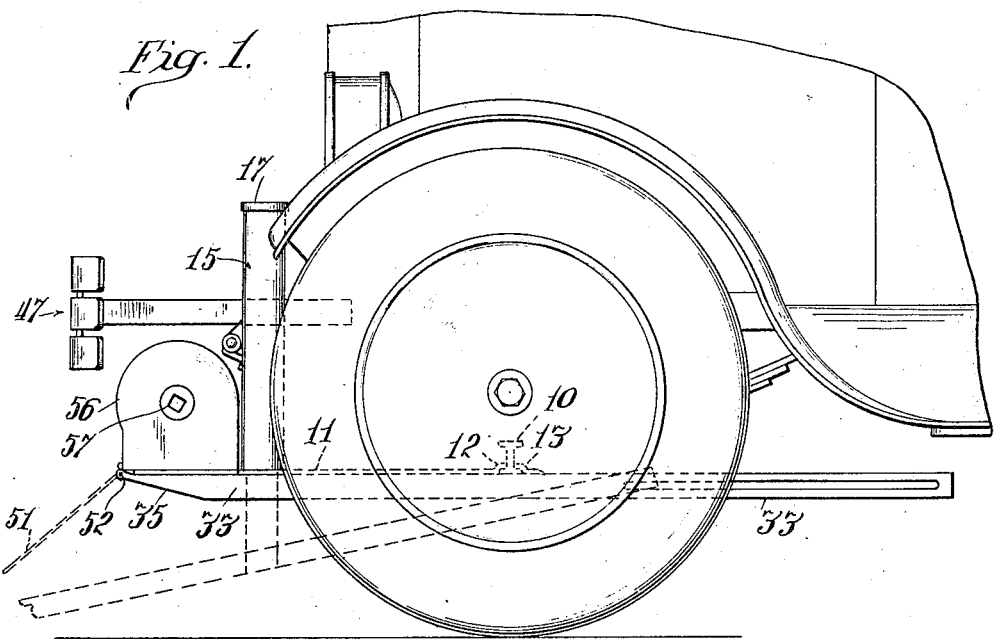

April 10, 1928.  1,665,251

H. BRUSCH

SAFETY FENDER

Filed May 28, 1927  3 Sheets-Sheet 1

Inventor
Helmuth Brusch
By Erich F. Michaelis
Attorney

April 10, 1928.
H. BRUSCH
SAFETY FENDER
Filed May 28, 1927
1,665,251
3 Sheets-Sheet 2
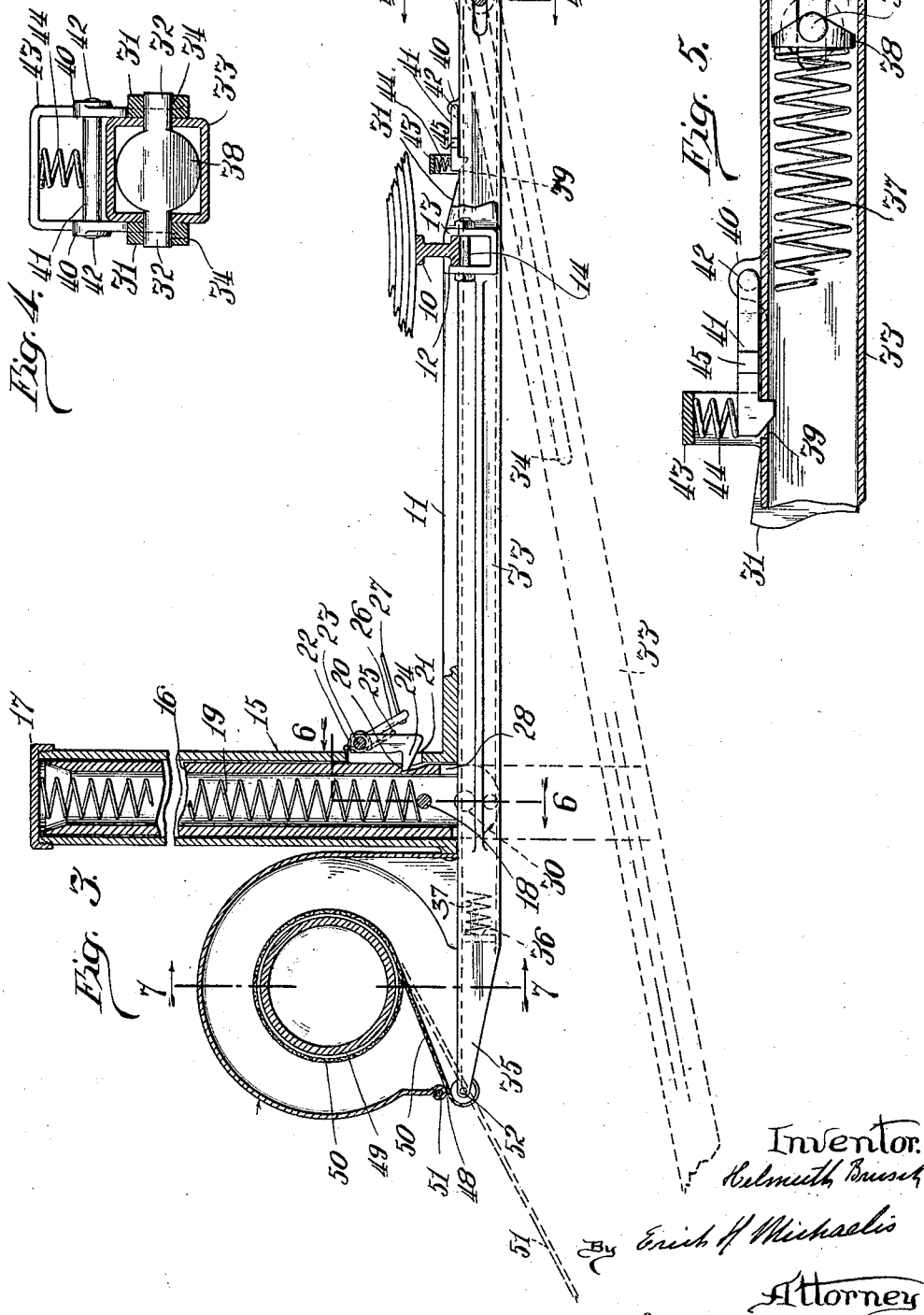

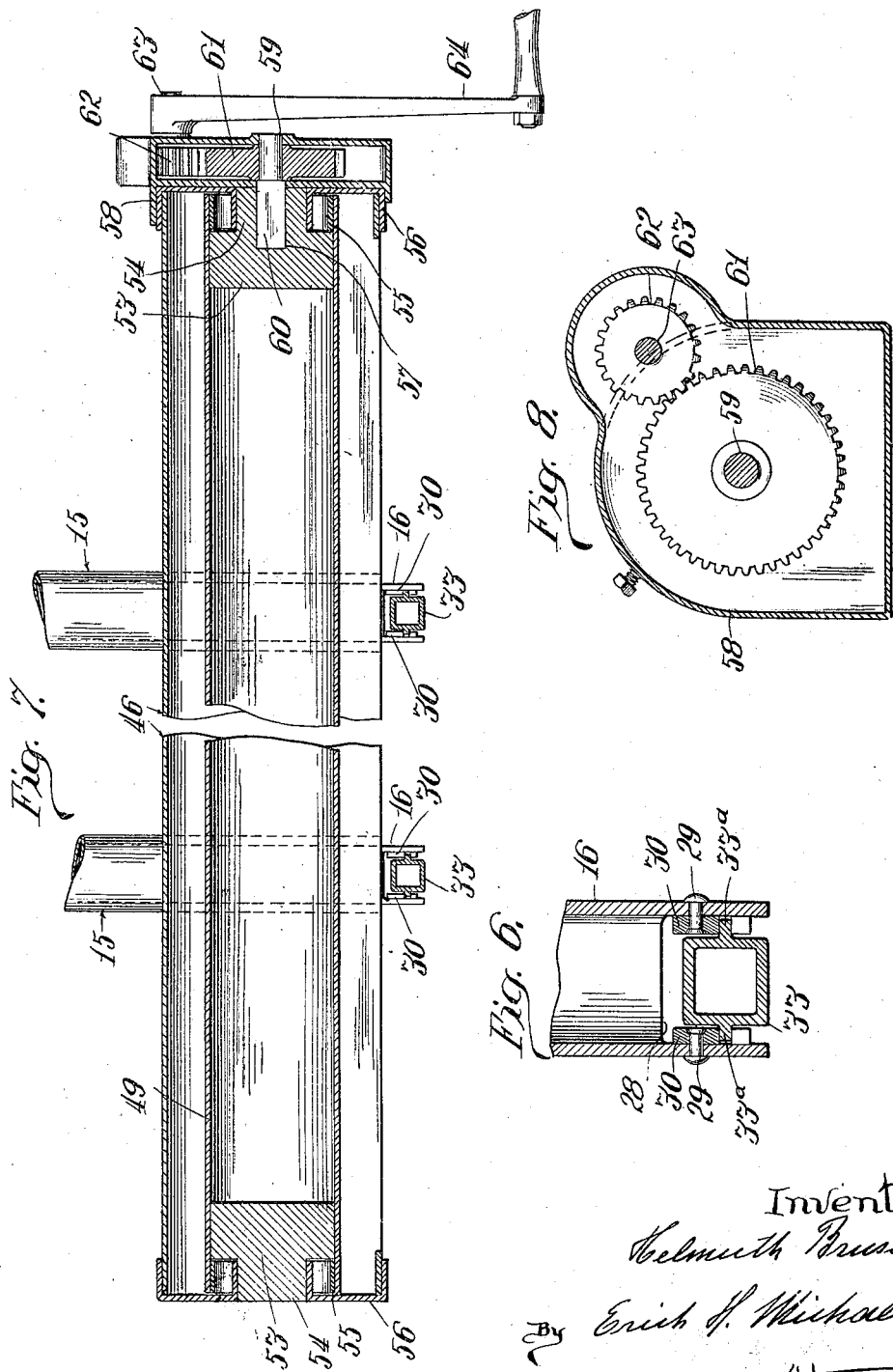

Patented Apr. 10, 1928.

1,665,251

UNITED STATES PATENT OFFICE.

HELMUTH BRUSCH, OF CHICAGO, ILLINOIS.

SAFETY FENDER.

Application filed May 28, 1927. Serial No. 195,010.

The invention relates to fender for automobiles. The present invention has for its purpose the prevention of accidents of running over man or animal. Devices for this purpose have been in use for quite a while on other power driven vehicles, such as electric street cars and locomotives. It has been however practically impossible so far to provide an automobile with a device for preventing the automobile from running over a human being or an animal, because such a device must be necessarily collapsible in order to be used with an automobile.

The object of the invention therefore, is to provide a fender adapted to catch a human being standing or walking in front of an automobile in motion.

A further object of the invention is to provide a fender adapted to be normally carried in collapsed position.

Another object of the invention is to provide a fender adapted to be extended into moving position practically immediately when the necessity of using said device arises.

Figure 2:
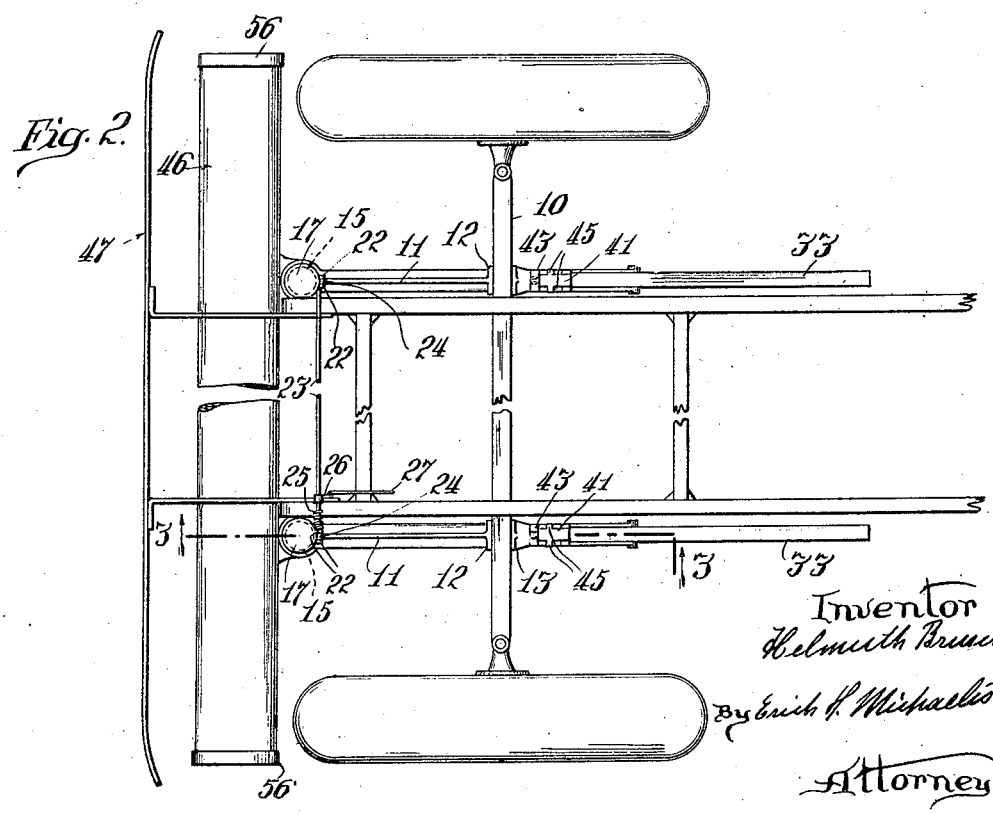

Other objects of the invention not specially mentioned may be easily ascertained and understood from the following description in view of the accompanying drawings forming a part thereof. It is however to be understood that the invention is not to be restricted or limited to the exact construction described in the following specification and shown in the drawings of which:

Figure 1 is a partial side view of an automobile equipped with the fender,

Figure 2 is a top view of the front part of the chassis of the automobile carrying the fender, Figure 3 is a section on line 3—3 in Figure 2, Figure 4 is a section on line 4—4 of Figure 3, Figure 5 is an enlarged view of the rear or the right hand end of Figure 3, Figure 6 is a section on line 6—6 of Figure 3, Figure 7 is a section on line 7—7 of Figure 3, And Figure 8 is an end view of Figure 7 seen from the right hand end of said figure.

On the front axle 10 of the automobile a pair of carrier castings 11 are fastened. Each of these castings has a U-shaped portion 12 adapted to engage the axle 10 and another U-shaped portion 13 is provided to co-operate with the portion 12 to hold the castings 11 in position. The portions 12 and 13 are provided with registering holes through which bolts 14 may be extended, by means of which the two portions may be clamped onto the axel 10, thereby holding the castings 11 in position. The casting itself extends at right angles to the axel and to the portions 12 and 14. Each casting consists actually of two arms extending parallel to each other. Said castings extend mainly forwardly of the axel and on the front part of each casting which castings are arranged on both sides of the motor, a housing 15 extends upwardly. It is to be understood that the housing may either be an integral portion of said casting or that it may be fastened to said casting in any desired manner. Inside of each of said housings a tube 16 or the like is slidably arranged. The top of the housing 15 is closed, for instance by a cap 17 which may be removably fastened to the housing 15. Adjacent the lower portion of the tube 16 a pin 18 extends diametrically through the tube 16 and a spring 19 is arranged inside of the tube 16 abutting with one of its ends the cap 17 and with its other end the pin 18. It is the be understood that it is not necessary to provide a pin 18 but that the interior of the tube 16 may be for instance provided with a horizontal wall or with another kind of means, as for instance a lug, adapted to be used as an abutment for the lower end of the spring 19. The spring 19 urges the sliding tube 16 downwardly in relation to the carrier casting 11 and to the automobile equipped therewith. In order to hold the tubes 16 in their normal or raised position, the walls of said tubes are each provided with a notch 20. The wall of the housing 15 is provided with an opening 21 in registration with the notch 20, when the tubes 16 are in their upper or normal position. Ears 22 are provided on the housing 15, one at each side of the opening or slot 22 and a shaft 23 extends rotatably through all four ears 22. A hook 24 is rigidly mounted on the shaft 23 adapted to extend through the openings 21 and to engage the upper shoulder of the notch 20 thereby holding the sliding tube 16 in its normal or upper position. The hooks 24 may be held in engagement with the notch 20 in any suitable way for instance by means of a spring 25 fastened with one of its ends to the shaft 23 and abutting with its other end the wall of one of the housings 15. A lever 26 is adjustably mounted on the shaft 23 and a rod 27 is hingedly connected with said lever and leads to the driver's seat of the automobile so that by pulling or pushing on said rod the shaft 23 may be rotated in the ears 22 whereby then the hooks 24 will be brought into or out of engagement with the notches.

The lower portions of the tubes 16 are slotted. These slots are arranged so that they will extend longitudinally of the automobile when the notch 20 is in the right location. The rear portion of the slot 28 in the lower portion of the tubes is somewhat deeper than the forward portion. In each side of the wall surrounding this slot a hole is provided through which a rivet or the like 29 extends carrying at its inner end a roller 30 for a purpose to be described later on.

From the clamp portion 13, mentioned above, an arm 31 extends rearwardly of which the end is shaped similar to the casting 11. Adjacent the end of said arms 31 therethrough a pin 32 extends. A square shaped tube 33 is located between the two side portions of the casting 11 of the arm 31. The rear part of this tube is provided with a slot 34 adapted to receive the pin 32. The tube 33 is pointed towards its forward end as indicated at 35, and at that place where this pointed portion joins the full sized tube a cross partition 36 is provided in the interior of the square tube. A spring 37 is arranged inside of the square tube 33 abutting with its forward end the cross partition 36 and with its rearward end the pin or bolt 32. For this purpose an abutment member 38 may be provided on the pin 32, as indicated in Figure 5. The spring 37 urges the square tube forwardly in relation to the casting and the arm fastened to the axel 10, and in order to prevent this forward movement of said tube said tube is provided with an opening 39 in its top wall adjacent the rear portion thereof. Ears 40 form an integral part of the cast arm 31 and a hook 41 is rigidly mounted on a short shaft 42 which is journaled in the ears 40. A small U-shaped bracket 43 forms also an integral part of the arm 31 and at the same time serves as an abutment for the upper end of a spring 44 arranged inside of said bracket. The lower end of the spring 44 engages the hook 41 and forces the nose of said hook into the opening 39 thereby preventing the square tube 33 from forward movement. The hook 41 is provided with lugs 45 extending sidewardly therefrom and engaging the top edges of the arm 31 thereby preventing the hook from swinging downwardly about the shaft 42.

The side walls of the square tube 33 are provided with a longitudinally extending center rib 33ª, adapted to be engaged by the rollers 30 of the sliding tube 16. This is especially shown in Figure 6.

In front of the two housings 15 a housing 46 extends crosswise of the automobile and is fastened in any suitable way to the housings 15 so that it is carried thereby. This housing 46 is preferably made from comparatively light sheet metal and in order to protect this housing against damage in case the automobile should bump against another automobile or any other obstruction, the usual bumper 47 of the automobile is arranged in front of said housing. Said housing is substantially cylindrical and has in its lower forward part, a slot 48 extending substantially over the whole length of said housing. The pointed end 35 of the square tube 33 is arranged adjacent the edge of said slot when the tube is in its normal or retracted position. Concentrically with the housing 46 a pipe 49 is rotatably mounted in a manner to be described later on. This pipe 49 serves as the carrier of a roll of fabric 50. The one end of said fabric is fastened to said pipe in any desirable and suitable manner while the other end of said roll of fabric is fastened to the forward end of the pointed portion 35 of the square tube 33. In order to prevent the fabric from being injured the edge of the hole 48 in the housing 46 may be provided with a bead 51 and across the two front portions 35 a rod 52 may extend crosswise over the front portion of the automobile. This rod extends beyond the square tubes and over the whole width of the automobile the same as the pipe 49 and the housing 46. It is necessary that the fabric be wide enough to extend over the whole width of the automobile and the outer end of the roll fabric is in reality fastened to the rod 52 carried by the square tubes 33.

In order to hold the pipe 49 in its concentric location relative to the housing 46 and in order to journal said pipe rotatably in said housing the following preferred arrangement is provided. It is however to be understood that any other suitable and desirable construction may be used without departing from the spirit of the invention. In each end of the pipe 49 a plug 53 is driven so that it will sit fast in said pipe. Each of said plugs has an outer portion 54 of smaller diameter than the plug itself. A metal ring 55 is then driven into the pipe 49 on top of the plug 53. A ring 56 is made from a channel shaped metal bar and the diameter measured on the inside of the outer leg of said channel is such that it fits tightly over the outside of the casing 46. The inner leg of the channel shaped bar lies snugly against the plug portion 54.

The channel is preferably made from brass or any other soft metal adapted for use in bearings. In one of the plugs a square hole 57 is provided. In order to rotate the pipe 49 which is journaled in the above described manner a casing 58 which may be a casting or may be made from brass, steel or the like is provided and fits tightly but removably over the channel ring 56 on that end of the pipe the plug whereof is provided with the square hole. In the casing 58 a pin 59 is centrally journaled which has a square outer portion 60 adapted to fit into the square hole 57. This square portion extends beyond the casing 58. A spur gear 61 is mounted on said pin inside of the casing, and a second spur gear 62 is also rotatably mounted in the casing 58 and meshes with the first mentioned gear. The shaft of the second gear 62 has a square outwardly projecting end 63, which is adapted to be received by a square opening in the end of a crank handle 64.

The device operates as follows: When the car is in motion the fabric is rolled upon the pipe 49. As soon as the driver notices that a human being or an animal is getting into the path of the automobile, he pulls on the rod 27 whereby he brings the hooks 24 out of engagement with the notches 20 in the sliding tubes 16. Thereby said tubes are released and the springs 19 force said tubes downwardly. The rollers 30 engaging the ribs 45 on the square tubes 33 will swing the forward end of said square tubes downwardly about the pins 32 in the arms 31. Since the hooks 41 cannot move downwardly with the said tubes the hooks will be extracted out of the holes 39, so that the tubes 33 will move forwardly under the pressure of the springs 37. Seeing that the rod 52 is fastened to the forward end of the square tubes 33 it is also fastened to the outward end of the fabric, this fabric will be rolled off the pipe 49 which will rotate in its bearings in the channel ring 56. The movement of the forward end of the square tube 33 will be downwardly and forwardly under the combined pressure of the springs 37 and the sliding tubes 16, so that the fabric will really scoop up the person or animals in the path of the automobile.

After the fender has been used the casing 58 will be put on the housing 46 in such a manner that the square blocks 60 will engage the square hole 57 whereupon the fabric will be rolled up onto the pipe 49 by simply rotating the pipe by means of the crank handle 64 and the gears 62 and 61. When the fabric is rolled up it will pull the rod 52 toward the automobile thereby giving the square tubes 33 an upward and rearward movement, and at the same time lifting the sliding tubes 16 by means of the engagement between the rollers 30 and the ribs 45 on the square tubes. As soon as the whole fabric is rolled upon the pipe 49 the sliding tube 16 must be in position to permit the spring 25 to force the nose of the hooks 24 into engagement with the shoulder of the notch 20 and at the same time the square tubes 33 will be shoved back far enough that the hooks 41 will again engage the holes 39 in said square tubes.

What I claim as new and desire to secure by Letters Patent is:

1. In a device of the class described a strip of fabric, a roller arranged at the front end of the automobile, and extending crosswise thereof said roller being rotatably supported the fabric being attached with one of its edges to said roller and adapted to be rolled up on said roller, a rod fastened to the front edge of the fabric, a pair of sliding members supported by the front axel of the automobile, said rod being fastened to the forward end of said sliding members and means for imparting to said sliding members a forward and downward movement.

2. In a device of the class described a roller, a strip of fabric fastened with one of its edges to the roller and adapted to be rolled upon said roller, a rod fastened to the free forward edge of said fabric, a housing extending crosswise over the front of the automobile, the roller being rotatably mounted in said housing a longitudinal slot in said housing, the fabric being adapted to slide through said slot, a pair of sliding members supported by the front axel of the automobile the rod being fastened to the forward end of said sliding members and means for imparting to said sliding members a forward and downward movement.

3. In a device of the class described, a pair of supporting arms removably fastened to the front axel of the automobile and extending lengthwise of said automobile, a housing extending vertically from each of said arms, said housings being opened on their lower ends, a tube slidably arranged in each of said housings, means for urging said tubes downwardly, a sliding member carried by each of said supporting arms, a rod fastened to the front ends of said sliding members and extending over the whole width of the automobile, a strip of fabric one edge of said fabric being fastened to said rod, a roller extending crosswise of the front of the automobile, the opposite edge of the fabric being fastened to said roller, the roller being rotatably mounted and adapted to receive the strip of fabric in a rolled up position, and means for giving the sliding members a forward movement, each of the sliding tubes engaging the adjacent sliding member and giving the same a downward movement.

4. In a device of the class described a pair of carrier arms supported by the front axel of the automobile and extending lengthwise of said automobile, a casing extending vertically from each of said arms and being open at its lower end a tube slidably arranged in each of said housings, means for urging the sliding tubes downwardly, a sliding member carried by each of said supporting arms, a rod fastened to the front ends of said sliding members, a strip of fabric, a roller extending crosswise over the whole width and arranged at the front end thereof, of the automobile, one edge of the strip of fabric being fastened to said rod and the opposite edge of the fabric being fastened to said roller, the fabric being adapted to be rolled upon said roller each sliding tube engaging the adjacent sliding member means for urging the sliding members forwardly and means for preventing the sliding tubes from downward movement and means for preventing the sliding members from forward movement.

5. In a device of the class described a pair of carrier arms supported by the front axel of the automobile, a housing vertically from each of said arms and open at its lower end, a tube slidably arranged in each of said housing, means for urging said sliding tubes downwardly, means for preventing downward movement of said tubes, a sliding member carried by each of said carrier arms, the forward ends of said members being adapted to be swung downwardly, means for urging the sliding members forwardly, the sliding tubes engaging the sliding members and tending to swing the forward ends of said members downwardly, a rod fastened to the forward ends of the sliding members, extending across the whole width of the automobile, a roller extending across the whole width of the automobile and rotatably mounted at the front end thereof, a strip of fabric, one edge of said fabric being fastened to the rod, the opposite edge being fastened to the roller, and the fabric normally rolled upon said roller, and means for releasing the sliding tubes from the means for preventing downward movement of said tubes, the sliding members being released for forward movement by the downward pressure of the sliding tubes.

In witness whereof I affix my signature.

HELMUTH BRUSCH.